United States Patent
Kim et al.

(10) Patent No.: US 9,122,134 B2
(45) Date of Patent: Sep. 1, 2015

(54) DISPLAY SCREEN FOR IMAGE DISPLAY SYSTEM AND METHOD FOR MANUFACTURING THE SAME

(75) Inventors: Sungtae Kim, Seoul (KR); Wonki Cho, Gyeonggi-Do (KR); Byunggil Ryu, Seoul (KR); Wonseok Jeon, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 1015 days.

(21) Appl. No.: 13/238,864

(22) Filed: Sep. 21, 2011

(65) Prior Publication Data

US 2012/0274910 A1    Nov. 1, 2012

(30) Foreign Application Priority Data

Apr. 29, 2011   (KR) .................... 10-2011-0041089

(51) Int. Cl.
    *G03B 21/14*    (2006.01)
    *G03B 21/10*    (2006.01)
    *G03B 21/28*    (2006.01)
    *G03B 21/602*   (2014.01)
    *G03B 21/62*    (2014.01)
    *G03B 21/625*   (2014.01)

(52) U.S. Cl.
    CPC ............... *G03B 21/10* (2013.01); *G03B 21/28* (2013.01); *G03B 21/602* (2013.01); *G03B 21/62* (2013.01); *G03B 21/625* (2013.01)

(58) Field of Classification Search
    CPC ....... G03B 21/10; G03B 21/62; G03B 21/625
    USPC ........ 353/30, 37, 38, 81, 98, 100; 349/5, 7–9, 349/87, 96, 176; 348/743–747; 359/352, 359/454, 459, 465, 487.02, 487.04, 493.01
    See application file for complete search history.

(56) References Cited

U.S. PATENT DOCUMENTS

| | | | |
|---|---|---|---|
| 6,710,919 B1 * | 3/2004 | Clausen ........................ | 359/453 |
| 6,788,460 B2 * | 9/2004 | Knox et al. .................... | 359/456 |
| 2004/0165261 A1 * | 8/2004 | Sekiguchi ..................... | 359/457 |
| 2005/0018306 A1 * | 1/2005 | Yoshida et al. ................ | 359/619 |
| 2005/0057804 A1 * | 3/2005 | Umeya et al. ................. | 359/449 |
| 2006/0139749 A1 * | 6/2006 | Watanabe et al. ............. | 359/460 |
| 2006/0268106 A1 * | 11/2006 | Cooper et al. ................ | 348/126 |
| 2011/0075108 A1 * | 3/2011 | Kojima et al. .................. | 353/38 |
| 2012/0105806 A1 * | 5/2012 | Kuo et al. ........................ | 353/7 |

* cited by examiner

*Primary Examiner* — Sultan Chowdhury

(74) *Attorney, Agent, or Firm* — Birch, Stewart, Kolasch & Birch, LLP

(57) ABSTRACT

Disclosed are a display screen for an image display system capable of providing an image having a high contrast ratio in a bright room, and a method for manufacturing the same. The display screen for displaying thereon image light emitted from a projector includes a lens layer, and a reflective layer formed on the lens layer and configured to reflect the image light, wherein the lens layer and/or the reflective layer contain a black material.

9 Claims, 3 Drawing Sheets

LIGHT(IMAGE LIGHT) FROM PROJECTOR

LIGHT(IMAGE LIGHT) FROM PROJECTOR

DISPLAY SCREEN FOR IMAGE DISPLAY SYSTEM AND METHOD FOR MANUFACTURING THE SAME

CROSS-REFERENCE TO RELATED APPLICATION

Pursuant to 35 U.S.C. §119(a), this application claims the benefit of earlier filing date and right of priority to Korean Application No. 10-2011-0041089, filed on Apr. 29, 2011, the contents of which is incorporated by reference herein in its entirety.

BACKGROUND OF THE INVENTION

1. Field of the Invention

This specification relates to a display screen for an image display system and a method for manufacturing the same.

2. Background of the Invention

Generally, the conventional display screen for an image display system is used to display image light (optical image) emitted from a projector thereon.

SUMMARY OF THE INVENTION

To achieve these and other advantages and in accordance with the purpose of this specification, as embodied and broadly described herein, there is provided a display screen for displaying thereon image light emitted from a projector, the display screen including a lens layer, and a reflective layer formed on the lens layer and configured to reflect the image light, wherein the lens layer and/or the reflective layer contain a black material.

The lens layer may be a linear type Fresnel lens layer or a circular type Fresnel lens layer.

The black material may be carbon black.

The amount of the carbon black contained in the lens layer may be in the range of 0.15%~0.75%.

The lens layer may include an ultraviolet hardening resin or a thermal hardening resin, and the black material.

The display screen for an image display system may further include a protective layer formed on a light-incident surface of the lens layer, and a light diffusion layer formed on the protective layer, wherein the protective layer is formed on a light-incident surface of the lens layer, and the reflective layer is formed on a light-exiting surface of the lens layer.

The reflective layer may include black pearl.

The display screen for displaying thereon image light emitted from a projector may further include a protective layer formed on a light-incident surface of the lens layer, and a light diffusion layer formed on the protective layer, wherein the reflective layer includes black pearl and is formed on a light-exiting surface of the lens layer.

The lens layer may include carbon black, and the reflective layer may include black pearl.

According to another aspect of the present invention, there is provided a display screen for displaying thereon image light emitted from a projector, the display screen including a Fresnel lens layer containing carbon black, and a reflective layer formed on the Fresnel lens layer and configured to reflect the image light.

According to still another aspect of the present invention, there is provided a display screen for displaying thereon image light emitted from a projector, the display screen including a Fresnel lens layer, and a black pearl layer formed on the Fresnel lens layer and configured to reflect the image light.

According to yet still another aspect of the present invention, there is provided a display screen for displaying thereon image light emitted from a projector, the display screen including a Fresnel lens layer containing carbon black, and a black pearl layer formed on the Fresnel lens layer and configured to reflect the image light.

To achieve these and other advantages and in accordance with the purpose of this specification, as embodied and broadly described herein, there is also provided a method for manufacturing a display screen for displaying thereon image light emitted from a projector, the method including forming a Fresnel lens layer by mixing an ultraviolet hardening resin or a thermal hardening resin with a black material, and forming a reflective layer on the Fresnel lens layer so as to reflect the image light.

According to another aspect of the present invention, there is provide a method for manufacturing a display screen for displaying thereon image light emitted from a projector, the method including forming a Fresnel lens layer having a light-incident surface and a light-exiting surface, and forming a black pearl layer on the light-exiting surface of the Fresnel lens layer so as to reflect the image light.

According to still another aspect of the present invention, there is provide a method for manufacturing a display screen for displaying thereon image light emitted from a projector, the method including forming a Fresnel lens layer by mixing an ultraviolet hardening resin or a thermal hardening resin with carbon black, and forming a black pearl layer on the Fresnel lens layer so as to reflect the image light.

To achieve these and other advantages and in accordance with the purpose of this specification, as embodied and broadly described herein, there is still also provided an image display system including a projector, a reflecting unit disposed on the projector and configured to change a path of light emitted from the projector, a display unit configured to display light reflected by the reflecting unit, and a supporting unit configured to support the display unit and the projector in a fixed manner. The display unit may include a display screen having a Fresnel lens layer, a reflective layer formed on a light-exiting surface of the Fresnel lens layer, a protective layer formed on a light-incident surface of the Fresnel lens layer, and a light diffusion layer formed on the protective layer. And, the Fresnel lens layer and/or the reflective layer may include a black material.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, with reference to FIGS. 1 to 5, will be explained a display screen for an image display system (e.g., a projector) capable of providing an image having a high bright room contrast ratio, and a method for manufacturing the same.

Figure 1:
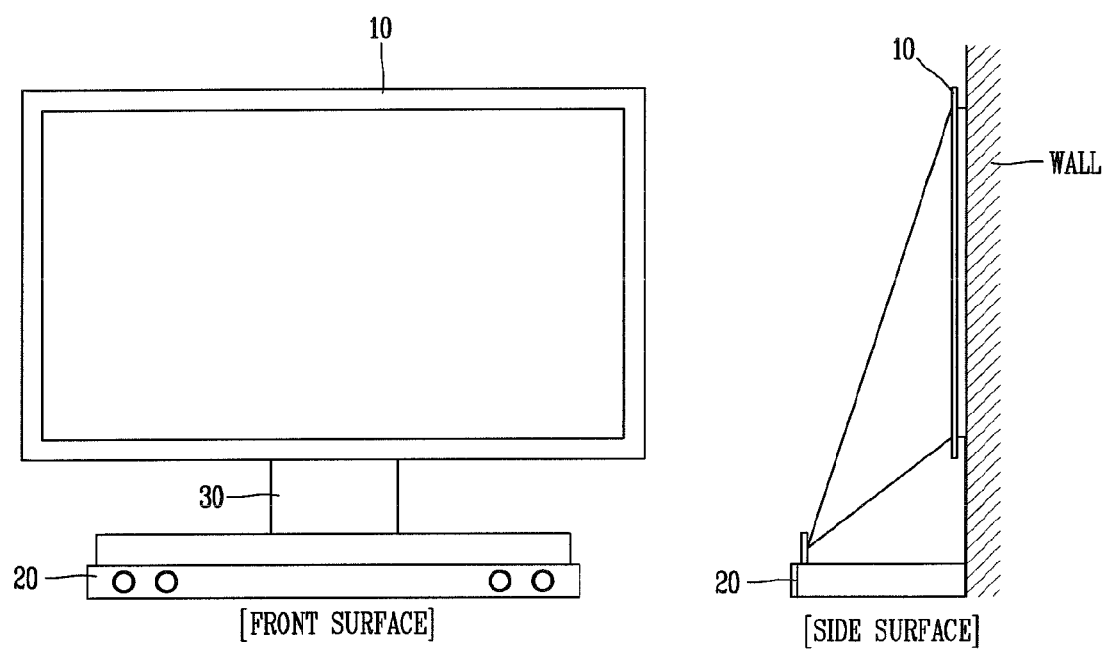
FIG. 1 is an exemplary view illustrating an image display system to which a display screen of the present invention has been applied.

FIG. 1 is an exemplary view illustrating an image display system to which a display screen of the present invention has been applied.

As shown in FIG. 1, an image display system to which a display screen of the present invention has been applied comprises a display unit 10, a projector 20 configured to project image light on the display unit 10, and a supporting unit 30 configured to support the display unit 10 and the projector 20 in a fixed manner such that the display unit 10 and the projector 20 maintain a preset distance therebetween for maintenance of a preset reference focus distance and screen size.

The projector 20 and the display unit 10 may be integrated with each other by the supporting unit 30. And, the supporting unit 30 may be fixed to a rear surface of the display unit 30 and a rear surface of the projector 20 by screws, etc.

The projector 20 may include an optics, a broadcast receiver configured to receive a broadcast signal from a server through a wired and/or wireless communication network, an external signal receiver, a speaker, an input means (e.g., a keyboard, a remote controller, etc.) and so on.

In the preferred embodiment of the present invention, the projector 20 and the display unit 10 are integrated with each other by the supporting unit 30. However, the display unit 10 may be fixed to an indoor wall, etc. as an additional member with removing the supporting unit 30.

Hereinafter, an example of an image display system to which a display screen of the present invention has been applied will be explained with reference to FIG. 2.

Figure 2:
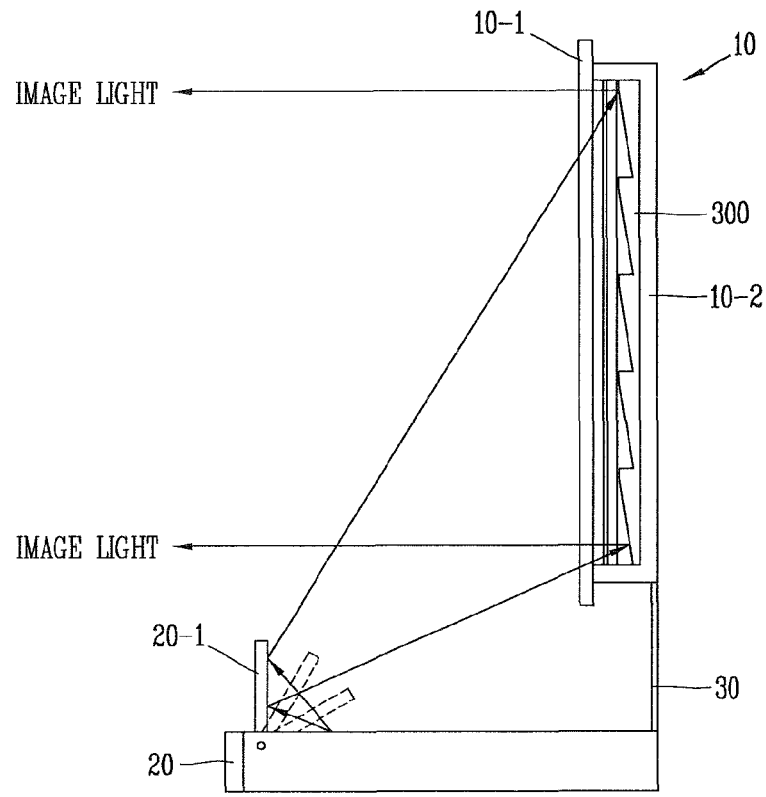
FIG. 2 is a view illustrating an example of an image display system to which a display screen of the present invention has been applied.

FIG. 2 is a view illustrating an example of an image display system to which a display screen of the present invention has been applied.

As shown in FIG. 2, an image display system to which a display screen of the present invention has been applied comprises a projector 20 having an optics, a broadcast receiver, an external signal receiver, a speaker, an input means and so on, a reflecting unit 20-1 disposed on the projector 20 and configured to change a path of light emitted from the projector 20, a display unit 10 configured to display light reflected by the reflecting unit 20-1, and a supporting unit 30 configured to support the display unit 10 and the projector 20 in a fixed manner. The display unit 10 includes a rear housing (rear cover) 10-2 configured to cover side surfaces and a rear surface of a display screen 300, and a transparent glass member (e.g., transparent reinforcing glass) 10-1 configured to cover a front surface of the display screen 300 for protection.

The rear housing (rear cover) 10-2 may be formed of an opaque material, and the glass member (e.g., reinforcing glass) 10-1 may be fixedly-adhered to the rear housing 10-2.

The reflecting unit 20-1 is configured to change a path of light emitted from the projector 20 so that light emitted from the optics inside the projector 20 can be reflected and enlarged to be projected on the display screen. The reflecting unit 20-1 may be rotated by a rotational force of a motor (not shown) thus to be unfolded when the projector 20 is turned ON. On the contrary, the reflecting unit 20-1 may be rotated by a rotational force of a motor (not shown) thus be folded in a direction of the projector 20 when the projector 20 is turned OFF.

The projector 20 is disposed below a front surface of the display unit 10, and is implemented as a front projection type image system in which outputted image light is incident onto the display unit 10 with an inclination angle and then is reflected from the display screen 300 of the display unit 10 to be outputted to a front surface where a user is positioned.

The reflecting unit 20-1 has been disclosed in the US Patent Publication No. 2009/0122274, and thus its detailed explanations will be omitted.

Figure 3:
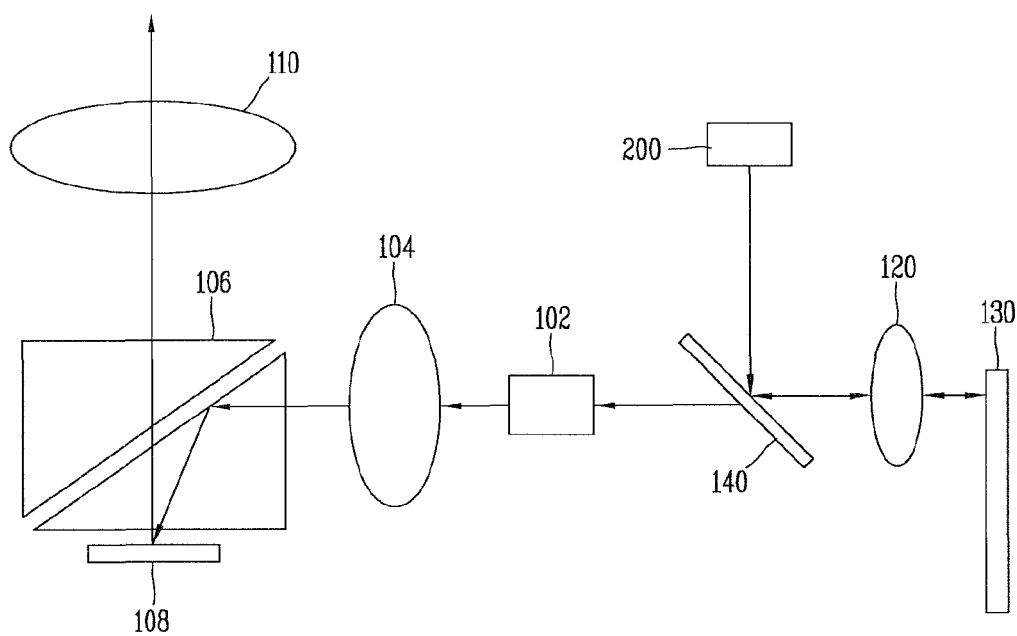
FIG. 3 is a view schematically illustrating a projector to which a display screen of the present invention has been applied.

FIG. 3 is a view schematically illustrating a projector to which a display screen of the present invention has been applied.

As shown in FIG. 3, the projector to which a display screen of the present invention has been applied includes an optical source array 200 having a plurality of optical sources, an optics 120 (e.g., a focusing optics), a color wheel 130 having a wavelength converting material (e.g., a fluorescent material), a light integrator 102, a delay optics or a collecting optics 104, a prism 106, a micro display imager and a projection lens 110. The projector has been disclosed in Korean Patent Publication No. 10-2010-0037646, and thus its detailed explanations will be omitted.

The projector to which a display screen of the present invention has been applied may further include a dichroic filter 140 installed between the optical source array 200 and the focusing optics 120. This dichroic filter 140 is configured to partially transmit or reflect the excited light according to a wavelength. More concretely, the dichroic filter 140 may be configured to transmit light having a short wavelength, but to reflect light having a long wavelength. Alternatively, the dichroic filter 140 may be configured to reflect light having a short wavelength, but to transmit light having a long wavelength. The dichroic filter 140 reflects the excited light towards the optics 120, and transmits a plurality of color lights generated from the color wheel 130.

Light emitted from the optical source array 200 is converted into a plurality of color lights through the color wheel 130. Then, the converted color lights pass through the optical integrator 102 for intensity homogenization (scrambling). The optical source array 200 may include a plurality of light emitting diodes (e.g., Blue LED), or a plurality of deep blue LEDs, or a plurality of UV LEDs, or a plurality of laser diodes.

The delay optics 104 is configured to focus light having undergone scrambling through the prism 106 on the micro display imager 108.

Light modulated by the micro display imager 108 is projected on the display screen (e.g., reflection type screen) 300 through the projection lens 110.

Multi-colored images are obtained through synchronization between the micro display imager 108 and the color wheel 130. Here, a signal processor for controlling the color wheel 130 and the micro display imager 108 is not shown.

The color wheel 130 includes a wavelength converting material for converting excited light generated from the optical source array 200 into different types of wavelengths for implementation of lighting. For instance, the color wheel 130 rotates (or linearly vibrates) by a motor thus to sequentially separate colors from the excited light, thereby generating a plurality of color lights having a high brightness. The color wheel 130 may apply light generated by the wavelength converting material to the light integrator 102.

Hereinafter, with reference to FIG. 4, will be explained a configuration of a display screen (e.g., reflection type screen) 300 for displaying thereon image light emitted from the projector.

Figure 4:
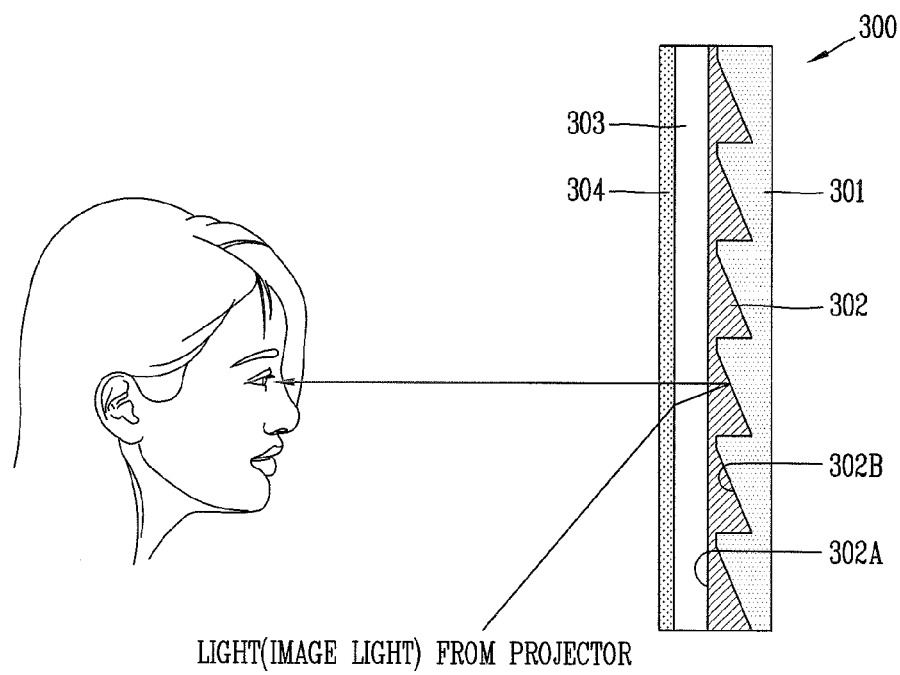
FIG. 4 is a view illustrating a configuration of a display screen according to a first embodiment of the present invention.

FIG. 4 is a view illustrating a configuration of a display screen according to a first embodiment of the present invention.

As shown in FIG. 4, a display screen 300 according to a first embodiment of the present invention includes a lens layer 302 (e.g., Fresnel lens layer) including a black material (e.g., carbon black), and a reflective layer 301 formed on the lens layer 302. The reflective layer 301 is formed on a light-exiting surface 302B of the lens layer 302.

The display screen 300 according to the first embodiment of the present invention may further include a protective layer 303 formed on the lens layer 302, and a light diffusion layer 304 formed on the protective layer 303. Here, the protective layer 303 may be formed on a light-incident surface 302A of the lens layer 302 for protection of the lens layer 302, and may be formed of polycarbonate (PC) or polyethyleneterephthalate (PET) layer. The polycarbonate (PC) or polyethyleneterephthalate (PET) layer may be deposited on the light-incident layer 302A of the lens layer 302, or may be attached onto the light-incident layer 302A of the lens layer 302 in the form of a film.

The light diffusion layer 304 may be formed on the protective layer 303 for enhanced scintillation. The light diffusion layer 304 may be a light diffusion resin is sheet having one roughened surface. The resin sheet may be manufactured in a casting manner or an extrusion molding manner with using a metallic pattern having undergone a roughening process by sand blast.

The light diffusion layer 304 may be implemented as a lenticular lens.

The lens layer 302 (e.g., Fresnel lens layer) includes the light-incident surface 302A and the light-exiting surface 302B, and the reflective layer 301 is formed on the light-exiting surface 302B of the lens layer 302.

The reflective layer 301 reflects light incident thereon to a predetermined direction (e.g., a viewer side direction) through the lens layer 302 (e.g., Fresnel lens layer) so that light emitted from the projector can be projected to a user (viewer) in the form of image light.

The reflective layer 301 may be a metallic layer (e.g., aluminum layer), or may be a mirror layer for reflecting light emitted from the projector.

The reflective layer 301 may be a coated mirror coated on the light-exiting surface 302B of the lens layer 302 (e.g., Fresnel lens layer), or may be a mirror film attached onto the light-exiting surface 302B.

The lens layer 302 may have a linear or circular type Fresnel lens structure. The linear or circular type Fresnel lens structure has been disclosed in Japanese Patent Registration No. 3,341,225 or the U.S. Pat. No. 6,023,369, and thus its detailed explanations will be omitted.

The lens layer 302 according to the first embodiment of the present invention includes a black material. For instance, the lens layer 302 may be formed by mixing an ultraviolet hardening resin or a thermal hardening resin with carbon black, the carbon black serving as a black material capable of reducing a black brightness. Alternatively, the lens layer 302 may be formed by adding a dispersing agent to the mixture between the ultraviolet hardening resin or thermal hardening resin and the carbon black. Here, the dispersing agent is used to evenly mix the materials with each other in a dispersion manner.

The lens layer 302 is colored by the black material (carbon black) so as to minimize brightness decrease of light reflected by the reflective layer 301 and so as to enhance a contrast of the light. More concretely, a user (viewer) may view an image having a high contrast ratio in a bright room owing to the colored Fresnel lens layer 302 including the black material (carbon black).

According to the amount (%) of the carbon black contained in the lens layer 302, a black brightness, a bright room brightness and a bright room contrast ratio have different experimental results as shown in the following table 1. The following table 1 shows experimental results measured in a bright circumstance (e.g., more than 1000 ANSI Lumen).

TABLE 1

| | Amount of carbon black (%) | | | | | |
|---|---|---|---|---|---|---|
| | 0 | 0.15 | 0.25 | 0.35 | 0.50 | 0.75 |
| Black Brightness (cd/m$^2$) | 6.1 | 5.10 | 4.13 | 3.22 | 2.95 | 2.39 |
| Bright Room Brightness (cd/m$^2$) | 435 | 387 | 415 | 418 | 283 | 281 |
| Bright Room Contrast Ratio | 71:1 | 76:1 | 100:1 | 130:1 | 96:1 | 118:1 |

Referring to the table 1, when the amount (%) of the carbon black contained in the lens layer 302 is 0%, the black brightness was 6.1 cd/m$^2$, the bright room brightness was 435 cd/m$^2$, and the bright room contrast ratio was 71:1.

When the amount (%) of the carbon black contained in the lens layer 302 is 0.15%, the black brightness was 5.10 cd/m$^2$, the bright room brightness was 387 cd/m$^2$, and the bright room contrast ratio was 76:1. When the amount (%) of the carbon black contained in the lens layer 302 is 0.25%, the black brightness was 4.13 cd/m$^2$, the bright room brightness was 415 cd/m$^2$, and the bright room contrast ratio was 100:1. When the amount (%) of the carbon black contained in the lens layer 302 is 0.35%, the black brightness was 3.22 cd/m$^2$, the bright room is brightness was 418 cd/m$^2$, and the bright room contrast ratio was 130:1. When the amount (%) of the carbon black contained in the lens layer 302 is 0.50%, the black brightness was 2.95 cd/m$^2$, the bright room brightness was 283 cd/m$^2$, and the bright room contrast ratio was 96:1. When the amount (%) of the carbon black contained in the lens layer 302 is 0.75%, the black brightness was 2.39 cd/m$^2$, the bright room brightness was 281 cd/m$^2$, and the bright room contrast ratio was 118:1. The amount (%) of the carbon black contained in the lens layer 302 may be in the range of 0.15%~0.75%.

As the amount (%) of the carbon black contained in the lens layer 302 is increased, the bright room brightness is decreased but the bright room contrast ratio is enhanced due to the decrease of the black brightness. This may provide an image having a high contrast ratio in a bright room.

The lens layer (e.g., Fresnel lens layer) 302 may further include not only carbon black, but also inorganic dye and inorganic pigment, organic dye and organic pigment, etc. When inorganic dye and inorganic pigment, organic dye and organic pigment, etc. are contained in the lens layer together with carbon black, the amount of the carbon black may be reduced.

As the inorganic pigment, may be used cobalt aluminete-based pigment (e.g., Co—AlO), chrome oxide-based pigment (e.g., CrO), $Fe_2O_3$ pigment (e.g., $\alpha$-$Fe_2O_3$), etc. As the organic pigment, Anthraquisone-based material (e.g., Red Fluorescent Dye-56) may be used. And, "C. I. Pigment Violet 19, 23" may be used as a colored component of the organic pigment.

The display screen according to the first embodiment of the present invention may provide an image having a high contrast ratio in a bright room as the bright room contrast ratio is increased by the carbon black contained in the lens layer 302.

Hereinafter, a display screen according to a second embodiment of the present invention will be explained with reference to FIG. 5. The display screen is capable of enhancing a bright room contrast ratio by forming the reflective layer 301 with using black pearl instead of a metallic layer (e.g., aluminum layer).

Figure 5:
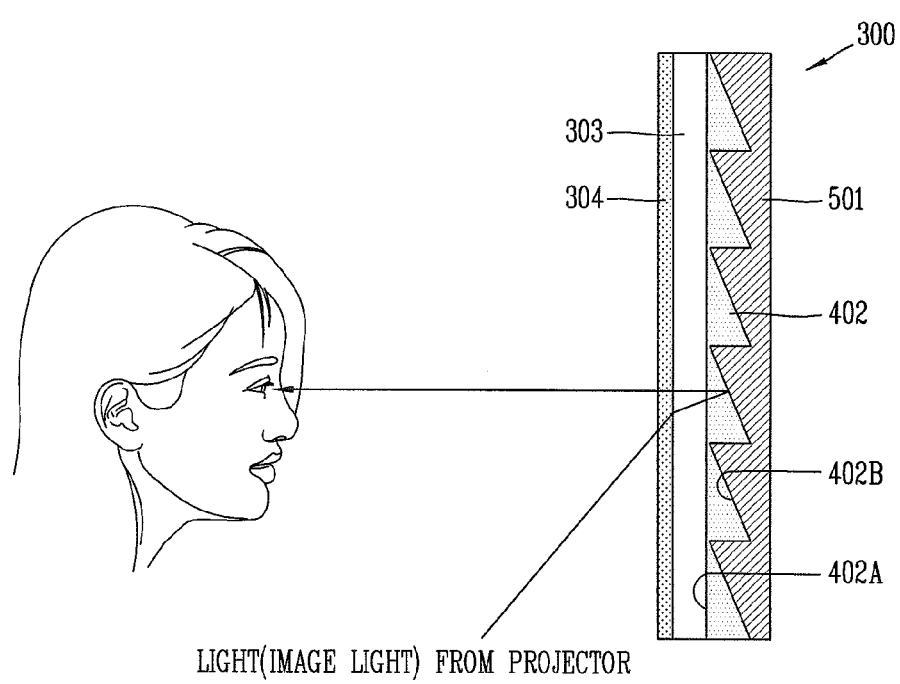
FIG. 5 is a view illustrating a configuration of a display screen according to a second embodiment of the present invention.

FIG. 5 is a view illustrating a configuration of a display screen according to a second embodiment of the present invention.

As shown in FIG. 5, the display screen 300 according to the second embodiment of the present invention includes a lens layer 402 (e.g., Fresnel lens layer), and a reflective layer 501 formed on the lens layer 402 and having a black material (e.g., black pearl). The reflective layer 501 is formed on a light-exiting surface 402B of the lens layer 402.

The display screen 300 according to the second embodiment of the present invention may further include a protective layer 303 formed on the lens layer 402, and a light diffusion layer 304 formed on the protective layer 303. Here, the protective layer 303 may be formed on a light-incident surface 402A of the lens layer 402 for protection of the lens layer 402, and may be formed of polycarbonate (PC) or polyethyleneterephthalate (PET) layer. The polycarbonate (PC) or polyethyleneterephthalate (PET) layer may be deposited on the light-incident layer 402A of the lens layer 402, or may be attached onto the light-incident layer 402A of the lens layer 402 in the form of a film.

The light diffusion layer 304 may be formed on the protective layer 303 for enhanced scintillation.

The lens layer 402 (e.g., Fresnel lens layer) includes the light-incident surface 402A and the light-exiting surface 402B, and the reflective layer 501 is formed on the light-exiting surface 402B of the lens layer 402.

The reflective layer 501 reflects light incident thereon to a predetermined direction (e.g., a viewer side direction) through the lens layer 402 (e.g., Fresnel lens layer) so that light emitted from the projector can be projected to a user (viewer) in the form of image light.

The lens layer 402 may have a linear or circular type Fresnel lens structure.

The reflective layer 501 of the display screen 300 according to the second embodiment of the present invention includes a black material. For instance, the reflective layer 501 is implemented as a black pearl layer formed of the black material, so as to minimize brightness decrease of light reflected by the reflective layer 501 and so as to enhance a contrast of the light. More concretely, a user (viewer) may view an image having a high contrast ratio in a bright room owing to the black pearl layer (reflective layer 501).

According to the material of the reflective layer 501, a black brightness, a bright room brightness and a bright room contrast ratio have different experimental results as shown in the following table 2. The following table 2 compares experimental results with respect to a reflective layer formed of aluminum with experimental results with respect to a reflective layer formed of black pearl, each is measured in a bright circumstance (e.g., more than 1000 ANSI Lumen).

TABLE 2

| | Aluminum Layer | Black Pearl Layer |
|---|---|---|
| Black Brightness ($cd/m^2$) | 6.1 | 0.81 |
| Bright Room Brightness ($cd/m^2$) | 435 | 194 |
| Bright Room Contrast Ratio | 71:1 | 240:1 |

Referring to the table 2, when an aluminum layer is formed on the light-exiting surface 402B of the Fresnel lens layer 402, the black brightness was 6.1 $cd/m^2$, the bright room brightness was 435 $cd/m^2$, and the bright room contrast ratio was 71:1.

On the other hand, when a black pearl layer is formed on the light-exiting surface 402B of the Fresnel lens layer 402, the black brightness was 0.81 $cd/m^2$, the bright room brightness was 194 $cd/m^2$, and the bright room contrast ratio was 240:1.

As the reflective layer 501 is formed of the black pearl layer, the bright room brightness is decreased but the bright room contrast ratio is enhanced due to the decrease of the black brightness. This may allow the display screen to display an image having a high contrast ratio in a bright room.

Here, the black pearl layer serving as the reflective layer 501 may be formed on the light-exiting surface 402B of the Fresnel lens layer 402 by being mixed with aluminum flakes.

Alternatively, the black pearl layer serving as the reflective layer 501 may be formed on the light-exiting surface 402B of the Fresnel lens layer 402 by being mixed with pigment-contained titanium oxide ($TiO_2$).

One of the carbon black-contained lens layer 302 and the black pearl layer 501 may be applied to the display screen. Alternatively, both of the carbon black-contained lens layer 302 and the black pearl layer 501 may be applied to the display screen.

As the bright room contrast ratio is increased due to the black pearl layer 501 formed on the light-exiting surface 402B of the Fresnel lens layer 402, the display screen according to the second embodiment of the present invention may provide an image having a high contrast ratio in a bright room.

As aforementioned, as the bright room contrast ratio is increased due to the carbon black contained in the lens layer 302, the display screen according to the present invention may provide an image having a high contrast ratio in a bright room.

As the bright room contrast ratio is increased due to the black pearl layer 501 formed on the light-exiting surface 402B of the Fresnel lens layer 402, the display screen according to the present invention may provide an image having a high contrast ratio in a bright room.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, to modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without is departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display screen for displaying thereon image light emitted from a projector, the display screen comprising: a lens layer having a light-incident surface and a light-exiting surface; a protective layer formed on the light-incident surface of the lens layer; and a reflective layer formed on a rear surface of the light-exiting surface, and configured to reflect the image light, wherein the lens layer contains carbon black and the reflective layer contains black pearl, and wherein an amount of the carbon black contained in the lens layer is in a range of 0.15%-0.75%.

2. The display screen of claim 1, wherein the lens layer is a linear type Fresnel lens layer or a circular type Fresnel lens layer.

3. The display screen of claim 1, wherein the lens layer comprises: an ultraviolet hardening resin or a thermal hardening resin.

4. The display screen of claim 1, further comprising: a light diffusion layer formed on the protective layer.

5. A method for manufacturing a display screen for displaying thereon image light emitted from a projector, the method comprising: forming a Fresnel lens layer having a light-incident surface and a light-exiting surface by mixing an ultraviolet hardening resin or a thermal hardening resin with carbon black; forming a protective layer formed on the light-incident surface of the Fresnel lens layer; and forming a reflective layer on a rear surface of the light-exiting surface of the Fresnel lens layer so as to reflect the image light, wherein the reflective layer contains black pearl, and the Fresnel lens layer contains carbon black, and an amount of the carbon black contained in the Fresnel lens layer is in a range of 0.15%~0.75%.

6. The method of claim 5, further comprising: forming a light diffusion layer on the protective layer.

7. An image display system, comprising: a projector; a reflecting unit disposed on the projector, and configured to change a path of light emitted from the projector; a display unit configured to display light reflected by the reflecting unit; and a supporting unit configured to support the display unit and the projector in a fixed manner, wherein the display unit comprises a display screen having a Fresnel lens layer having a light-incident surface and a light-exiting surface, a reflective layer formed on a rear surface of the light-exiting surface of the Fresnel lens layer, a protective layer formed on the light-incident surface of the Fresnel lens layer, and a light diffusion layer formed on the protective layer, wherein the Fresnel lens layer contains carbon black, and the reflective layer contains black pearl, and wherein an amount of the carbon black contained in the Fresnel lens layer is in a range of 0.15%~0.75%.

8. The image display system of claim 7, wherein the display unit comprises: a rear housing configured to cover side surfaces and a rear surface of the display screen; and a transparent glass member configured to cover a front surface of the display screen.

9. The image display system of claim 7, wherein the supporting unit is configured to support the display unit and the projector in the fixed manner such that the display unit and the projector maintain a preset distance therebetween for maintenance of a preset reference focus distance and screen size.

* * * * *